United States Patent
Ohashi

(10) Patent No.: US 8,739,846 B2
(45) Date of Patent: Jun. 3, 2014

(54) PNEUMATIC TIRE WITH TREAD HAVING AT LEAST ONE GROOVE HAVING PLANAR INCLINED FACE CONNECTED TO GROOVE BOTTOM

(75) Inventor: Toshiyuki Ohashi, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 468 days.

(21) Appl. No.: 12/614,533

(22) Filed: Nov. 9, 2009

(65) Prior Publication Data

US 2010/0170601 A1   Jul. 8, 2010

(30) Foreign Application Priority Data

Jan. 6, 2009 (JP) ................... 2009-001020

(51) Int. Cl.
  *B60C 11/04* (2006.01)
  *B60C 11/13* (2006.01)
(52) U.S. Cl.
  USPC ...................... 152/209.21; 152/901
(58) Field of Classification Search
  USPC ............................ 152/209.21, 901
  See application file for complete search history.

(56) References Cited

U.S. PATENT DOCUMENTS

| 4,703,787 A * | 11/1987 | Ghilardi | 152/209.21 |
| 2002/0092591 A1 * | 7/2002 | Cortes | 152/209.18 |

FOREIGN PATENT DOCUMENTS

| JP | 62-286803 A | * | 12/1987 |
| JP | 62286803 A | | 12/1987 |
| JP | 05-338412 | | 12/1993 |
| JP | 9164814 A | | 6/1997 |
| JP | 2001-010309 | | 1/2001 |
| JP | 2002-211211 A | * | 7/2002 |
| JP | 2007-030547 A | * | 2/2007 |
| JP | 2008006854 A | | 1/2008 |

OTHER PUBLICATIONS

Translation for Japan 62-286803 (no date).*
Machine translation for Japan 2002-211211 (no date).*
Machine translation for Japan 2007-030547 (no date).*
Japanese Office Action for Application No. 2009-001020, dated Nov. 8, 2010, 3 pages.
Communication from Japanese Application No. 2009-001020 dated Jul. 12, 2011.

* cited by examiner

Primary Examiner — Steven D Maki
(74) Attorney, Agent, or Firm — Fish & Richardson P.C.

(57) ABSTRACT

In a pneumatic tire, at least one groove wall face of at least one of the grooves includes a portion located at the tread surface side and a portion located at a groove bottom side with respect to the portion located at the tread surface side, the portion located at the tread surface side includes a plane face that forms a right angle or an obtuse angle with respect to the land portion surface, and a bottom face extending outward in a width direction of the groove from an end at the groove bottom side of the plane face, the portion located at the groove bottom side has an inclined face extending from the groove bottom in the width direction toward the outside of the bottom face, the inclined face and the bottom face form therebetween a recess portion recessed outward in the width direction of the groove.

4 Claims, 2 Drawing Sheets

PNEUMATIC TIRE WITH TREAD HAVING AT LEAST ONE GROOVE HAVING PLANAR INCLINED FACE CONNECTED TO GROOVE BOTTOM

BACKGROUND OF THE INVENTION

1. Field of the Invention

The present invention relates to a pneumatic tire having a tread surface which includes a plurality of grooves formed thereon and a plurality of land portions segmented by the grooves, and a rolling resistance of the pneumatic tire is reduced.

2. Description of the Related Art

Conventionally, in order to reduce a rolling resistance of a pneumatic tire, rubber of a low loss tangent ((loss tangent)= (loss modulus)/(storage modulus); hereinafter simply referred to as "tan δ") is used as rubber disposed in a tread portion (tread rubber). However, when the rubber of low tan δ is used, although the rolling resistance can be reduced, the tread rubber tends to yield easily. As a result, a ground contact area of the tread rubber decreases resulting in a decrease of wet braking performance (braking performance on wet road surface) of a pneumatic tire. Therefore, in view of performances of a tire such as wet braking performance, it is required to reduce the rolling resistance of pneumatic tire by arranging a tread pattern while maintaining the tan δ of the tread rubber to a certain high level.

The present inventors intensively reviewed a relationship between a distortion and the rolling resistance in various portions of a tread pattern on a tire during running on the tire. As a result, it was found that the distortion was the largest at a bottom portion of a groove formed in a land portion of a tread surface in contact with a ground, and found that by reducing the distortion at this groove bottom portion, the rolling resistance of the pneumatic tire could be reduced.

Japanese Unexamined Patent Publication No. 05-338412 discloses a pneumatic tire for heavy load, which has a rib pattern/rib rug pattern formed on the tread surface. In such a pneumatic tire, a main groove has a groove bottom face having a single arc shape and a groove wall face abutting on the groove bottom face and extending being inclined in a direction that a groove width decreases toward the tread surface as viewed in a cross section of the main groove extending in a circumferential direction of the tire. With such an arrangement, this pneumatic tire is intended to prevent a convergence of distortion at the groove bottom and to thereby reduce cracking damages in the groove bottom. However, such an arrangement does not have a satisfactory effect of reducing the distortion at the groove bottom portion in the land portion. Therefore, this pneumatic tire cannot reduce the rolling resistance.

Japanese Unexamined Patent Publication No. 2001-10309 discloses a pneumatic tire having a tread surface which includes blocks. In the respective blocks, each of wall faces located at a lateral groove side is formed in a generally L-shaped recessed portion as viewed in the cross section, which expands toward the lateral groove when the block comes into contact with the ground. In the wall face of the side wall, a point of about ½ height of groove depth of the lateral groove is recessed inward the block inner than a normal line connecting a block end at the side wall and a rolling axis of the tire. With such an arrangement of the pneumatic tire, it is intended to prevent partial wear, or so-called heal and toe wear in which one end in a circumferential direction of the respective block surfaces is extremely worn into a saw-tooth like shape along a circumferential direction of the tire. However, Japanese Unexamined Patent Publication No. 2001-10309 does not suggest a method for reducing the distortion at the groove bottom portion between the land portions.

SUMMARY OF THE INVENTION

The present invention has been proposed in view of the aforementioned circumstances, and an object of the present invention is to provide a pneumatic tire in which a rolling resistance is reduced.

In order to achieve the aforementioned object, using a pneumatic tire formed with conventional grooves 11 having a U-shape in cross section and a plurality of land portions 12 segmented by the grooves 11 as shown in FIG. 3A, the inventors of the present invention measured a degree of distortion in the land portions 12 during running on the tire, and intensively examined the relationship between the degree of distortion and the rolling resistance. As a result, it was found that, in such a pneumatic tire, a central portion 12C in a groove depth direction of the land portion 12 deforms to expand toward the groove 11 as shown in FIG. 3B, as viewed in the cross section of the tire. That is, the land portion 12 deforms into a so-called barrel shape during running on the tire, and the distortion becomes large at a groove bottom portion 12b of the land portion 12. It is accordingly understood that, when the deformation of the land portion 12 into a barrel shape is inhibited and the distortion at the groove bottom portion 12b of the land portion 12 is reduced, the rolling resistance of the pneumatic tire can be reduced. The present invention has been proposed based on the considerations mentioned above, and the above-mentioned object is achieved with a structure described below.

That is, a pneumatic tire according to the present invention has a tread surface which includes a plurality of grooves formed thereon and a plurality of land portions segmented by the grooves, wherein at least one groove wall face of at least one of the grooves includes a portion located at the tread surface side and a portion located at a groove bottom side with respect to the portion located at the tread surface side, the portion located at the tread surface side includes a plane face that forms a right angle or an obtuse angle with respect to the land portion surface, and a bottom face extending outward in a width direction of the groove from an end at the groove bottom side of the plane face, the portion located at the groove bottom side has an inclined face extending from the groove bottom in the width direction toward the outside of the bottom face, the inclined face and the bottom face form therebetween a recess portion recessed outward in the width direction of the groove.

In the pneumatic tire, at least one groove wall face of at least one groove includes the portion located at the groove bottom side. The portion located at the groove bottom side has the inclined face extending from the groove bottom in the width direction toward the outside of the bottom face, and the recess portion recessed outward in the width direction of the groove is formed between the inclined face and the bottom face. With this arrangement, since the recess portion is formed in advance in a part of the groove wall face of the groove, the land portion can be prevented from being deformed into a barrel shape as viewed in a cross section of the tire during running on the tire. Furthermore, since the portion located at the groove bottom side has the inclined face extending from the groove bottom in the width direction toward the outside of the bottom face, compared to the conventional groove having a U-shape in cross section, a larger inclination angle (an angle formed by a normal line of the tread surface and the inclined face) can be set at the groove bottom. As a result, since the distortion at the groove bottom portion of the land portion can be reduced, the rolling resistance of the pneumatic tire can be reduced.

In the pneumatic tire, at least one groove wall face of at least one of the grooves includes the portion at the groove bottom side and the portion located at the tread surface side. The portion located at the tread surface side includes the plane face and the bottom face. The plane face forms a right angle or an obtuse angle with respect to the land portion surface. The bottom face extends from the end at the groove bottom side of the plane face outward in the width direction of the groove. This arrangement ensures the rigidity in the edge portion of the tread surface of the land portion abutting on the groove. As a result, the partial wear; particularly, heal and toe wear of the pneumatic tire can be prevented.

In the pneumatic tire, defining the depth of the groove as D; and defining the distance from the tread surface to the bottom face as D1, D1 is preferably set so as to be 0.4 D to 0.7 D. With this arrangement, the recess portion is located at a depth where the land portion tends to expand the most toward the groove during running on the tire. Therefore, the land portion can be prevented more effectively from being deformed into a barrel shape. This arrangement further reduces the rolling resistance of the pneumatic tire. In addition, this arrangement ensures satisfactory depth of the plane face of the portion at the tread surface side. Therefore, the rigidity of the edge portion in the tread surface of the land portion abutting the groove can be further increased. With this arrangement, the partial wear, particularly, heal and toe wear of the pneumatic tire can be more reliably prevented.

In the pneumatic tire, the inclined face is preferably arranged to extend from a point of the groove bottom which is closer to the center of the groove than the edge between the tread surface and the plane face but which does not exceed the center of the groove. This arrangement ensures a satisfactory inclination angle at the bottom of the groove. Therefore, the distortion at the groove bottom portion of the land portion can be reduced. As a result, the rolling resistance of the pneumatic tire can be further reduced.

In the pneumatic tire, the boundary portion between the bottom face and the recess portion is preferably formed in an arc shape in cross section. Generally, when the grooves are formed in the tread surface, ribs (projecting portions) corresponding to the shape of the grooves are disposed at an inner surface of the mold that comes into contact with a green tire before vulcanization. In this case, when the boundary portion between the bottom face and the recess portion is formed in an arc shape in cross section, releasing property when removing the pneumatic tire after the vulcanization from the mold (mold releasing property) is increased. Accordingly, workability of molding and vulcanization of the pneumatic tire can be increased, and additionally, the durability of the ribs can be increased.

DETAILED DESCRIPTION OF THE PREFERRED EMBODIMENTS

Figure 1:
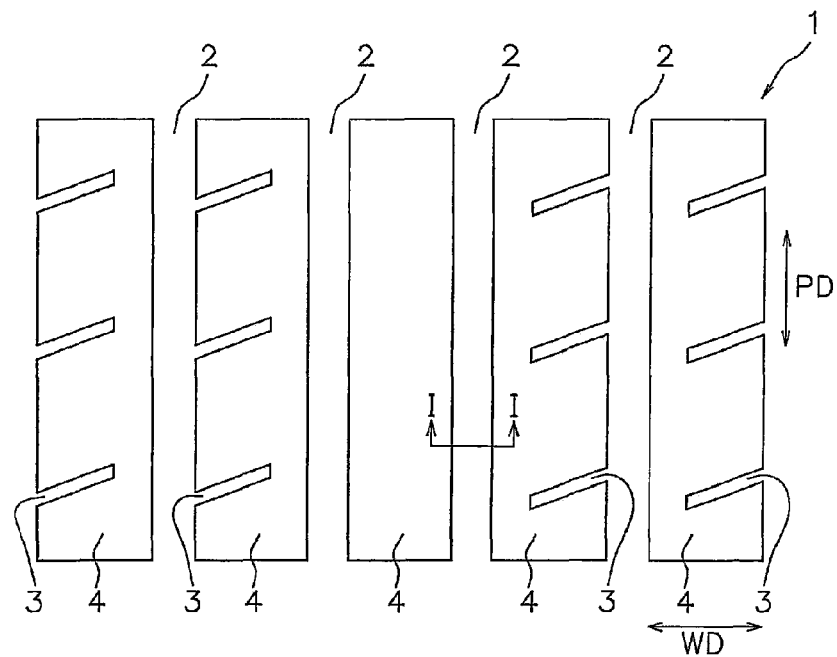
FIG. 1 is a plan view showing an example of a tread pattern of a pneumatic tire according to the present invention.
Figure 2:
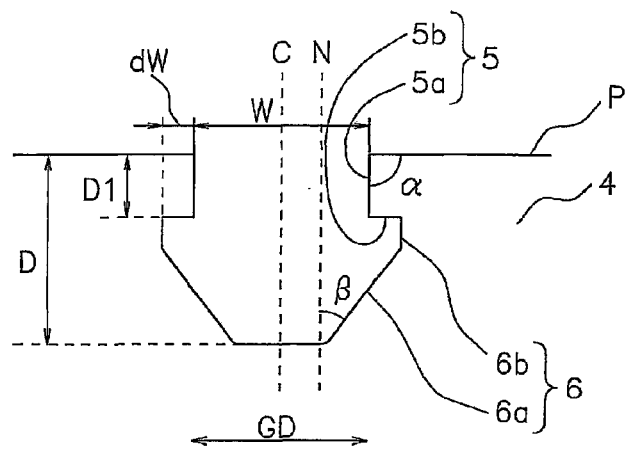
FIG. 2 is a sectional view taken along line I-I as viewed in a direction of arrows.

Preferred embodiments of the present invention will be described below with reference to the drawings. FIG. 1 is a plan view showing an example of a tread pattern of a pneumatic tire according to the present invention. FIG. 2 is a sectional view taken along line I-I as viewed in a direction of arrows in FIG. 1.

In the pneumatic tire of the present embodiment, a tread surface 1 includes five ribs 4 segmented by four main grooves 2 extending in a circumferential direction PD of the tire and a plurality of lateral grooves 3 extending in a width direction WD of the tire, which are formed in the tread surface 1 as shown in FIG. 1. Although an example in which the ribs are formed as land portions is given in the present embodiment, the present invention can provide a similar effect on any pneumatic tires that include blocks as land portions.

In the present invention, the groove "extending in a circumferential direction PD of the tire" is not limited to a groove that extends straight in the circumferential direction PD, but may be a groove in a zigzag or curved shape; and may also be a groove that extends being inclined with respect to the circumferential direction PD of the tire. Likewise, the groove "extending a width direction WD of the tire" is not limited to a groove extending straight in the width direction WD of the tire, but may be a groove in a zigzag or curved shape; and may also be a groove that extends being inclined with respect to the width direction WD of the tire.

According to the present embodiment, each of the main grooves 2 is formed of a pair of groove wall faces. As shown in FIG. 2, each of the groove wall faces includes a portion 5 located at the tread surface P side and a portion 6 located at the bottom side with respect to the portion 5 located at the tread surface side. The portion 5 located at the tread side includes a plane face 5a and a bottom face 5b. The plane face 5a extends substantially perpendicular to the surface of the abutting rib 4 (in FIG. 2, an angle indicated by "α"). The bottom face 5b extends outward in a width direction of the groove from an end at the groove bottom side of the plane face 5a (in FIG. 2, a direction indicated by "GD"). The portion 6 located at the groove bottom side includes an inclined face 6a and a recess portion 6b. The inclined face 6a extends from the groove bottom in the width direction toward the outside of the bottom face 5b. The recess portion 6b is formed between the inclined face 6a and the bottom face 5b, and is recessed outward in the groove width direction. With such an arrangement, the recess portion 6b is formed in advance in a portion of the groove wall face of the main groove 2, so that the rib 4 is prevented from being deformed into a barrel shape as viewed in a cross section of the tire during running on the tire. In addition, the inclined face 6a extends from the groove bottom in the width direction toward the outside of the bottom face 5b while increasing the groove width. Therefore, compared to the conventional groove having a U-shape in cross section, a larger inclination angle may be set at the groove bottom (in FIG. 2, an angle β formed by a normal line N of the tread surface and the inclined face 6a). As a result, since a distortion in the groove between the ribs 4 can be reduced, the rolling resistance of the pneumatic tire can be reduced. It should be noted that the inclined face 6a is formed in a tapered shape in the present embodiment. However, the inclined face 6a may be formed in a curved shape being recessed toward the groove bottom side.

According to the present embodiment, each of the groove wall faces of the main grooves 2 includes the portion 6 located at the groove bottom side and the portion 5 located at the tread side. The portion 5 located at the tread surface side includes the plane face 5a in an angle perpendicular to the tread surface of the abutting rib 4, and the bottom face 5b extending from the end at the groove bottom side of the plane face 5a outward in the width direction of the groove. With this arrangement, the rigidity in an edge portion of the tread surface P of the rib 4 abutting on the main groove 2 is ensured. As a result, partial wear; particularly heel and toe wear of the pneumatic tire can be prevented. In order to ensure the rigidity of the edge portion in the tread surface P on the rib 4 abutting on the main groove 2, the angle α formed by the tread surface P of the abutting rib 4 and the plane face 5a needs to be a right angle or an obtuse angle. However, in view of mold releasing property of the pneumatic tire after vulcanization, the angle α formed by the plane face 5a and the tread surface P of the abutting rib 4 is preferably set to 90 to 120°; preferably set to substantially 90°.

In the pneumatic tire of the present embodiment, when defining the groove depth of the main groove 2 as D; and defining the distance from the tread surface P to the bottom face 5b as D1, D1 is preferably set so as to be 0.4 D to 0.7 D. With this arrangement, the recess portion 6b is positioned at a depth where the rib 4 tends to expand the most toward to the main groove 2 during running on the tire. Therefore, the ribs 4 can be more effectively prevented from being deformed into a barrel shape. As a result, the rolling resistance of the pneumatic tire can be reduced more effectively. Furthermore, the depth of the plane face 5a of the portion 5 located at the tread surface side is satisfactorily ensured. Therefore, the rigidity of the edge portion in the tread surface P of the rib 4 abutting on the main groove 2 can be increased more effectively. Therefore, partial wear; particularly, heal and toe wear of the pneumatic tire can be prevented more reliably. In order to reduce the rolling resistance of the pneumatic tire and to further increase the anti partial wear performance, D1 is preferably set so as to be 0.4 D to 0.6 D.

The groove depth D of the main groove 2 is not particularly limited, but specifically, for example, a groove depth of 7 to 9 mm is exemplified. The distance D1 from the tread surface P to the bottom face 5b of the portion 5 located at the tread side is, for example, 2 to 6 mm.

The groove width W (opening width) of the main groove 2 in the tread surface P is not particularly limited, but particularly, for example, a groove width of 7 to 12 mm is exemplified. In order to effectively prevent the rib 4 from being deformed into a barrel shape during running on the tire, a recess amount dW from the edge between the tread surface P and the plane face 5a to the recess portion 6 is preferably set so as to be 0.1 W to 0.2 W.

According to the present embodiment, the inclined face 6a extends from a groove bottom point which is closer to the center of the groove than the edge between the tread surface P and the plane face 5a but which does not exceed the groove center C. This arrangement ensures a satisfactory inclination angle β at the groove bottom. Therefore, the distortion at the groove bottom portion of the rib 4 can be further reduced. As a result, the rolling resistance of the pneumatic tire can be reduced more reliably. In view of the rolling resistance of the pneumatic tire, the inclination angle β is preferably set to 30 to 70°.

(Other Embodiments)

(1) The above-described embodiment describes an example in which both of the groove wall faces of all main grooves 2 are provided with the portion 5 located at the tread surface side and the portion 6 located at the groove bottom side. However, in the present invention, the portion 5 located at the tread surface side and the portion 6 located at the groove bottom side may be, for example, provided only to the main groove 2 in which the distortion tends to converge on the groove bottom portions of the rib 4 during running on the tire. Furthermore, only one groove wall face of the main groove 2 may be provided with the portion located at the tread surface side and the portion located at the groove bottom side.

(2) The above-described embodiment describes an example in which the portion 5 located at the tread surface side and the portion 6 located at the groove bottom side are provided only to the groove wall faces of the main grooves 2. In the present invention, however, the portion 5 located at the tread surface side and the portion 6 located at the groove bottom side may be provided to the groove wall faces of the lateral grooves 3.

(3) The above-described embodiment describes an example in which the bottom face 5b of the portion 5 located at the tread surface side is formed substantially in parallel to the tread surface P, and a boundary area between the bottom face 5b and the recess portion 6b is formed substantially at a right angle. The boundary area between the bottom face 5b and the recess portion 6b may be formed in an arc shape in section. In this case, the mold releasing property of the pneumatic tire after vulcanization is increased, and vulcanizing workability of the pneumatic tire is increased. In addition, durability of the rims disposed in an inner periphery of the mold can be increased.

EXAMPLES

Examples and the like that particularly demonstrate a structure and an effect of the present invention will be described below. Performance evaluation of tires was conducted as described below.

(1) Rolling Resistance

Using test tires (tire size: 195/65R15), rolling resistances were measured during on-drum test running and were evaluated using indexes. Defining an inverse number of a rolling resistance of Comparative Example 1 as 100 and utilizing the same as the index, a larger index indicates a larger reduction in rolling resistance. Running conditions were as listed below. That is, drum diameter: 1.7 m, camber angle: 0°, air pressure: 210 kPa, speed: 80 km/h, and load: 4,300 N.

Example 1

The following pneumatic tire was prepared. That is, the tread surface 1 shown in FIG. 1 was formed with four main grooves 2 and a plurality of lateral grooves 3, and every main groove 2 was provided with a portion 5 located at the tread surface side and a portion 6 located at the groove bottom side shown in FIG. 2 on each of the groove wall faces, and the angle α formed by the tread surface of the abutting rib 4 and the plane face 5a was set to 90°; the groove depth D of the main groove 2 was 8 mm; the groove width W of the main groove 2 in the tread surface P was set to 10 mm; the proportion between the groove depth D of the main groove 2 and the distance D1 from the tread surface P to the bottom face 5b in the portion 5 located at the tread surface side was set so as to be D1=0.5 D (D1: 4 mm); the proportion between the groove width W of the main groove 2 in the tread surface P and the recess amount dW from the edge between the tread surface P and the plane face 5a to the recess portion 6 was set so as to be dW=0.1 W; and the taper angle β at the groove bottom was set to 40°. The result obtained by measuring the rolling resistance using such a tire is shown in Table 1.

Comparative Example 1

Figure 3A:
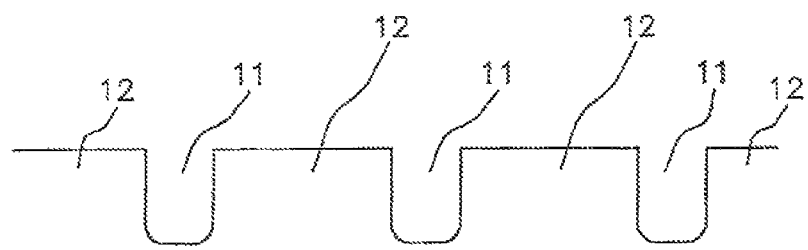
FIG. 3A is a sectional view showing an example of a pneumatic tire in which conventional grooves having a U-like sectional shape are formed.
Figure 3B:
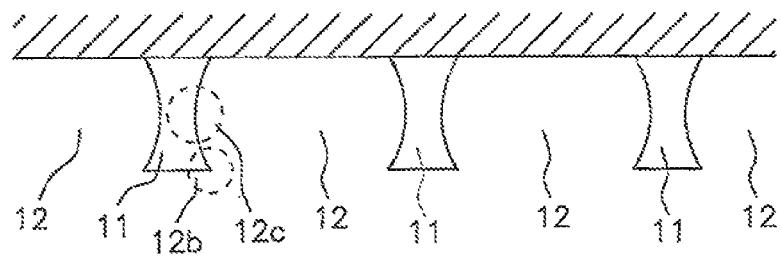
FIG. 3B is a view showing a deformation of land portions of the pneumatic tire of FIG. 3A during running on the tire.

A pneumatic tire having the tread surface 1 shown in FIG. 1 formed with four main grooves 2 and a plurality of lateral grooves 3 was prepared. The main grooves 2 were formed in a U-shape in cross section shown in FIG. 3A. The groove depth and the groove width were set so as to be the same as those in Example 1, and accordingly groove area and void ratio (groove volume ratio) were set the same as those in Example 1. The result obtained by measuring the rolling resistance using such a tire is shown in Table 1.

TABLE 1

|  | Comparative Example 1 | Example 1 |
|---|---|---|
| Rolling resistance | 100 | 108 |

From the result of Table 1, it can be seen that the rolling resistance is reduced in the pneumatic tire of Example 1 compared to the pneumatic tire of Comparative Example 1. In the pneumatic tire of Example 1, the groove area and void ratio (groove volume ratio) can be set the same as those of the main groove having the U-shape in cross section. Therefore, the WET braking performance can be satisfactorily ensured.

What is claimed is:

1. A pneumatic tire having a tread surface which includes a plurality of grooves formed thereon, with each of the grooves having a groove opening at the tread surface, and a plurality of land portions segmented by the grooves,
    wherein at least one groove wall face of at least one of the grooves includes a portion located at the tread surface side and a portion located at a groove bottom side with respect to the portion located at the tread surface side,
    the portion located at the tread surface side includes a plane face that forms a right angle or an obtuse angle with respect to the tread surface, and a bottom face extending outward in a width direction of the groove from an end at the groove bottom side of the plane face,
    the portion located at the groove bottom side has a planar inclined face that is connected to the groove bottom and extends in the width direction toward the outside of the bottom face, the planar inclined face and the bottom face form therebetween a recess portion recessed outward in the width direction of the groove, the groove opening has a constant width (W) along the entire length of the groove at the tread surface, the recess portion is wider in the groove width direction than is the groove opening at the tread surface, and a boundary of the recess portion between the bottom face and the planar inclined face is substantially at a right angle to the bottom face.

2. The pneumatic tire according to claim 1,
    wherein, when defining the depth of the groove as D, and defining the distance from the tread surface to the bottom face as D1, D1 is set so as to be 0.4 D to 0.7 D.

3. The pneumatic tire according to claim 1,
    wherein, the inclined face is arranged to extend from a point of the groove bottom which is closer to the center of the groove than the edge between the tread surface and the plane face but which does not exceed the center of the groove.

4. A pneumatic tire having a tread surface which includes a plurality of grooves formed thereon, with each of the grooves having a groove opening at the tread surface, and a plurality of land portions segmented by the grooves,
    wherein at least one groove wall face of at least one of the grooves includes a portion located at the tread surface side and a portion located at a groove bottom side with respect to the portion located at the tread surface side,
    the portion located at the tread surface side includes a plane face that forms a right angle with respect to the tread surface, and a bottom face extending outward in a width direction of the groove from an end at the groove bottom side of the plane face,
    the portion located at the groove bottom side has a planar inclined face that is connected to the groove bottom and extends in the width direction toward the outside of the bottom face, the planar inclined face and the bottom face form therebetween a recess portion recessed outward in the width direction of the groove, the groove opening has a constant width (W) along the entire length of the groove at the tread surface, the recess portion is wider in the groove width direction than is the groove opening at the tread surface, and
    wherein, a boundary of the recess portion between the bottom face and the planar inclined face is formed in an arc shape in cross section.

* * * * *